Aug. 2, 1955  J. W. GOFF  2,714,389
DRINKING FOUNT FOR POULTRY AND DOMESTIC ANIMALS
Filed Jan. 30, 1952
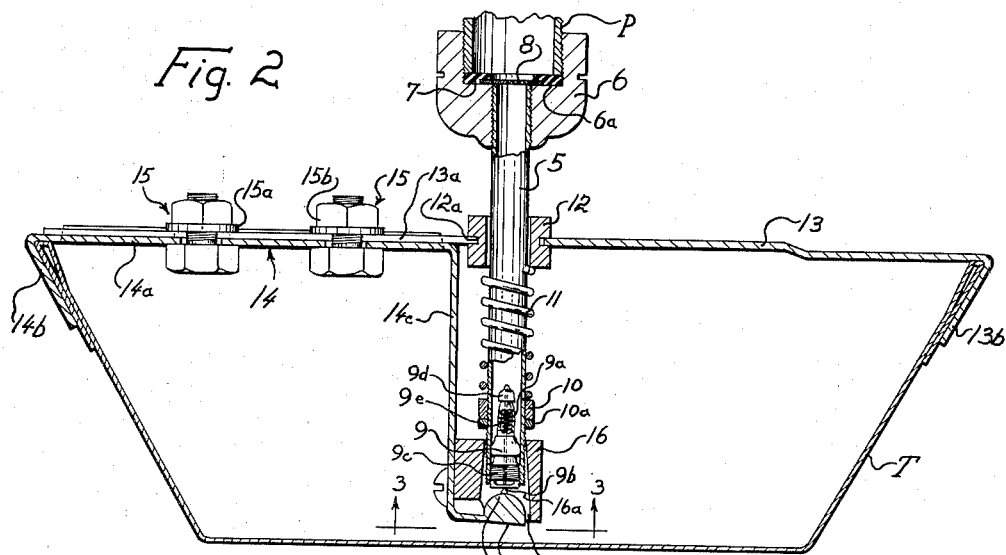
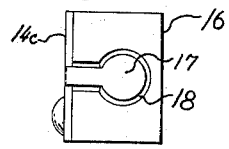
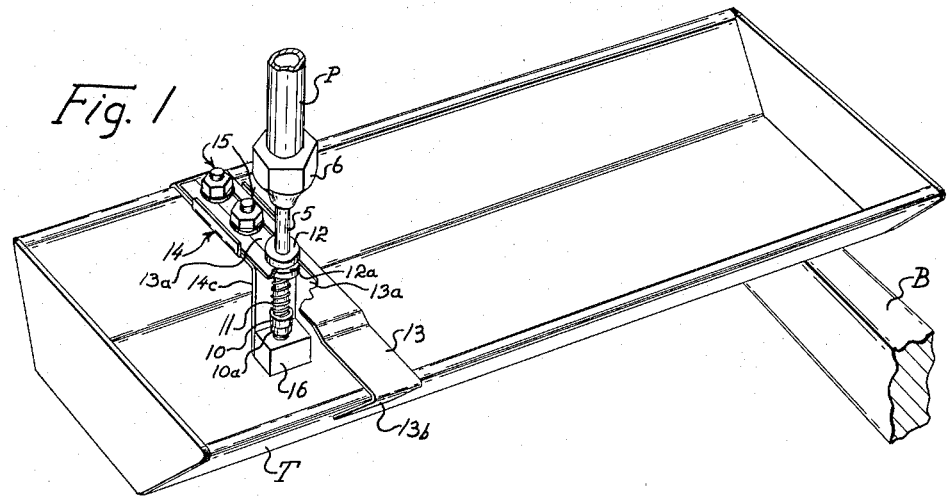
INVENTOR
JOHN W. GOFF
BY *Williamson & Williamson*
ATTORNEYS

United States Patent Office 2,714,389
Patented Aug. 2, 1955

2,714,389

DRINKING FOUNT FOR POULTRY AND DOMESTIC ANIMALS

John W. Goff, St. Paul, Minn.

Application January 30, 1952, Serial No. 269,014

7 Claims. (Cl. 137—408)

This invention relates to drinking founts for poultry and domestic animals, and particularly to founts where the flow and level of water therein are controlled by the accumulated weight of water in the trough or bowl.

My present invention is an improvement in certain respects upon the drinking fount disclosed in United States Patent No. 2,501,727 granted March 28, 1950 to Charles L. Kubista.

It is an object of my invention to provide a mechanism or device for ready adjustment to the depending end of a water pipe or other analagous source of liquid supply which will support in part or in entirety a trough or fount and which will provide control of water supply to the trough or fount responsive to the level and weight of water therein.

A further object is the provision of a trough actuated drinking fount structure which will be readily attachable to troughs and bowls varying substantially in width and size and which will support the trough or other receptacle in a convenient position for use by poultry or domestic animals while supplying efficient mechanism for controlling the level of liquid in the trough at all times.

A still further object is the provision of mechanism of the class described wherein the discharge of water into the receptacle is cushioned and deflected to prevent splashing thereof.

These and other objects and advantages of my invention will more fully appear from the following description made in connection with the accompanying drawings wherein like reference characters refer to similar parts throughout the several views, and in which:

Fig. 1 is a perspective view of an embodiment of my invention applied to a straight trough of conventional structure, said trough being supported at one end upon a rail;

Fig. 2 is a vertical section taken transversely through the trough and substantially axially of the water supply pipe and the mechanism of my invention supported therefrom; and Fig. 3 is a detailed bottom plan view taken substantially along the line 3—3 of Fig. 2.

My entire device and mechanism is adapted to be supported from the depending end of a rigid water supply pipe P which may be affixed to a wall or post and has the depending discharge terminal externally threaded for reception of a cup.

My improved structure includes a relatively short supporting tube 5 of rigid construction having swiveled to its upper portion the enlarged coupling nut 6 which is internally threaded to engage the discharge extremity of the supply pipe P. A suitable compressible packing washer 7 is interposed between the annular extremity of pipe P and an annular, internal shoulder 6a provided by the coupling nut 6 and preferably a small circular strainer 8 is retained in place between the washer 7 and said annular shoulder.

The supporting tube 5 is open at its lower extremity and is internally threaded to accommodate and receive a conventional automotive tire valve mechanism indicated as an entirety by the numeral 9, said valve mechanism having the usual tubular portion 9a constituting a guide for the valve stem 9b which has its lower and outer end projecting below the threadedly attached casing 9c and which has affixed to its inner or upper end the valve element 9d adapted to seat against the tubular element 9a when the valve is normally closed by action of an encircling coil spring 9e.

An adjustable support collar 10 in the form of a nut threadedly engages and is supported from an intermediate portion of supporting tube 5 near the lower end thereof. A lock nut 10a is also provided threadedly engaging the supply tube for desirably setting the position of support collar 10. A coil trough-supporting spring 11 encircles the intermediate portion of support tube 5 and is interposed between the support collar 10 and a heavy collar 12 which is loosely and slidably mounted upon the upper portion of the support tube 5. The collar 12 yieldingly supported by coil spring 11 acts as a support for the trough or receptacle as well as for a simplified, depending valve actuating mechanism. As shown, collar 12 is provided with a circumferential annular groove 12a wherein are received the opposing longitudinal inner edges 13a of a bifurcated horizontal trough supporting strap 13. The strap 13 is slotted or bifurcated for a considerable distance at its inner end and has its outer end, as shown, bent downwardly and inwardly at an angle of less than 90 degrees to constitute a clamping arm 13b for engaging the side of a conventional trough T. The shape of the arm 13b also lends itself to engagement with the upper peripheral portion of a bowl of conventional type.

The strap 13 is slidably and adjustably secured to a longitudinally aligned and second supporting strap 14 which has a horizontal or upper portion 14a disposed beneath the inner slotted portion of strap 13 and is adjustably secured to said slotted portion of strap 13 by suitable means such as a pair of nutted clamping bolts designated as entireties by the numeral 15. The clamping nuts utilized for the bolts, as shown, are threadedly attached to the upstanding threaded shanks of the bolts below and have disc collars 15a of a diameter to fit between the opposing edges of the bifurcated portion of strap 13. The bodies 15b of the nuts are of greater overall cross-sectional area than the collars 15a and overlie the edges of the bifurcated portion of strap 13. Thus, the collars 15a substantially fill the space between the opposing edges 13a of strap 13 preventing relative lateral shifting of the two straps 13 and 14 while nevertheless permitting longitudinal adjustment of the strap 13. The outer end of supporting strap 14 is bent downwardly and inwardly at an angle less than 90 degrees to form a clamping arm 14b adapted to engage the opposite side of a conventional trough or bowl from the portion engaged by the clamping arm 13b of strap 13.

The strap 14 at its inner end includes a depending preferably integrally formed, mounting arm 14c to the lower end of which is secured a relatively thick tube-positioning block 16. The block 16 is vertically apertured to form a passage 16a open at upper and lower ends and preferably said passage at its upper end is adapted to fit with slight clearance the exterior of the supporting tube 5 while tapering from its large or lower end to said upper end. At the extremity of the mounting arm 14c a combined valve-actuating and water-deflecting element 17 is rigidly affixed as by welding or if desired by integral formation with the mounting arm 14c. Said element 17 extends substantially at right angles to the lower end of the mounting arm 14c and has a semi-spherical portion 17a opposed and substantially axially centered with reference to the projecting extremity of the valve stem 9b. The bottom of the thick block 16 is cut, as clearly shown in the bottom plan view of Fig. 3, to accommodate the shape of element 17 leaving an almost annular slot 18 for water discharge into the trough below.

The strength and tension of the supporting coil spring 11 is such as to slightly overcome the weight of the trough when empty and the weight of my mechanism supported from the hub support collar 12. Upward movement of the trough and mounting relative to the supporting tube 12 is, of course, limited by engagement of the rigid valve-actuating element 17 with the bottom end of the supporting tube or valve casing mounted therewith.

In operation, with the trough or receptacle T empty, the hub collar 12 is elevated by coil spring 11 to topmost position relative to the supporting tube 5, thereby causing the valve stem 9b to be pressed upwardly releasing the valve element 9d and permitting water to flow through the supporting tube 5 and out of the discharge end of said tube. This water is directed axially against the top of the semi-spherical valve-actuating and water-deflecting element 17 where it is uniformly spread in its discharge stream radially of the axis of discharge. The water gently discharges from the annular slot 18 defined between the bottom of the apertured block 16 and the element 17 flowing rather uniformly to the central portion of the trough and eliminating any forcible discharge or splashing of the water as it enters the trough.

As the discharged water accumulates in the trough or receptacle T the weight thereof overcomes the supporting effect of the coil spring 11 encircling supporting tube 5, causing support collar 12 to gradually lower with the accumulation of water and to, of course, lower the relative position of the depending mounting arm 14c and its valve control element 17 secured to the lower end thereof until at a predetermined time the valve stem 9b is completely released, whereupon the actuating small coil spring 9e of the valve structure with a pressure of water behind the same seats the valve element 9d and water supply is closed off. My mechanism is adjusted by positioning of the adjustment collar 10 to cause the normal level of water within the trough of the receptacle to be at a predetermined line below the top edge thereof.

With my improved structure it will be seen that various shapes and lengths of drinking troughs may be accommodated and supported in part or in entirety from the clamping arms 13b and 14b of the support straps 13 and 14. The spaced relation of said clamping arms may be varied within relatively wide limits by release and adjustment of the clamping nuts 15b constituting a part of the nutted clamping bolt structures 15.

While in the embodiment illustrated in Fig. 1 an elongated trough is shown as supported adjacent one end thereof upon a rail or beam B, it will, of course, be seen that with a number of watering receptacles such as bowls or rectangular pans, the entire receptacle may be supported from the support collar 12, proper adjustment being made upon adjustment collar 10 at the lower end of support tube 5 for more than counteracting the normal weight of the receptacle and mechanism mounting of my structure.

It will further be seen that concentrated jet discharge and consequent splashing of the water dispensed by my apparatus is eliminated through the provision of the centering and tube-guiding block 16 having the vertical discharge aperture therethrough, in combination with the combined valve-actuating and spherical deflector element 17.

The cooperation of the compactly related simplest mechanism including the central hub or supporting collar 12 with the adjustably related support straps 13 and 14 connected therewith and with the support tube 5 and apertured block 16 and valve operating arm 17, produces a thoroughly accurate and highly efficient mounting support and valve control for drinking founts of various types, eliminating the requirement of any floor support-ed mounting or floor operated mechanism for controlling supply of liquid to the receptacle.

It will, of course, be understood that various changes may be made in the form, details, proportions and arrangement of the various parts without departing from the scope of the invention.

What I claim is:

1. A device for supporting fount receptacles and for controlling the supply of liquid to such receptacles having in combination, a vertical support tube, means for removably securing said support tube in vertical position to the discharge end of a depending liquid supply pipe, mounting structure supported upon the intermediate portion of said support tube and including a pair of receptacle-supporting arms extending radially from said support tube, each of said arms having a receptacle-retaining element at the outer end thereof, said elements being adapted to cooperate to engage and support a receptacle, means for longitudinally adjusting said arms to vary a spaced relation of said receptacle-engaging elements, said tube having a valve therein, mechanism responsive to the amount of liquid in a receptacle supported by said mounting structure for controlling the operation of said valve, a depending arm secured to the medial portion of said mounting structure and extending downwardly to a point below the lower end of said support tube, said support tube having a liquid discharge passage at the lower end thereof and a deflecting and splash-preventing element connected to the lower end of said depending arm directly below said discharge passage for affecting the distribution of liquid discharged, said element having a valve-operating abutment fixed to the lower portion of said depending arm in opposition to the valve controlling mechanism to actuate the same.

2. A device for supporting fount receptacles and for controlling the supply of liquid to such receptacles having in combination, a vertical support tube, means for removably securing said support tube in vertical position to the discharge end of a depending liquid supply pipe, mounting structure having a medial member slidably disposed upon the intermediate portion of said support tube and having a pair of receptacle-supporting arms extending generally radially from said medial member, said arms each having at the outer end thereof a receptacle-engaging element, said elements being spaced apart to cooperatively engage and support a fount receptacle, said support tube having liquid discharge media at the lower portion thereof, a valve within the lower portion of said support tube having a seat disposed inwardly of said liquid discharge media and having a valve-operating stem projecting axially of said tube below the lower end thereof, a depending arm secured at its upper end to the medial portion of said mounting structure and extending downwardly in close relation to said support tube to a point adjacent the lower end of said tube and a valve-opening element connected to the lower end of said depending arm and positioned in opposition to the outer end of said valve operating stem and having a fixed spaced relation with the lower end of said support tube and resilient means interposed between the medial portion of said tube and the underportion of said mounting structure for urging said mounting structure upwardly upon said tube and for consequently urging said element upwardly to open said valve and to retain the same in open position until weight of accumulated liquid in a receptacle held by said receptacle-supporting arms is sufficient to overcome the tension of said resilient means.

3. The structure set forth in claim 2 and said valve-opening element having a liquid discharge deflecting surface opposed to the liquid flowing from said discharge media of said tube to disseminate flow of liquid and to avoid splashing thereof in the receptacle.

4. A device for supporting fount receptacles and for controlling the supply of liquid to such receptacles having in combination, a vertical support tube, means for removably securing said support tube in vertical position to the discharge end of a depending liquid supply pipe, mounting structure slidably disposed upon the intermediate portion of said support tube and including a pair of opposed horizontally spaced receptacle-engaging elements, means for adjusting the spaced relation of said elements to accommodate and support liquid receptacles varying considerably in diameters or widths, an apertured member secured to said mounting structure and disposed at a distance below the same for encircling the lower end of said supporting tube and having a depending liquid passage formed therein open at its lower end, a support abutment secured upon the lower portion of the exterior of said tube support, a coil spring interposed between said abutment and said supporting structure of a tension sufficient to more than overcome the weight of said mounting structure and the receptacle when the same is empty, a valve of the automotive tire type mounted within the lower portion of said support tube and having the usual axial valve stem projecting beyond the end of said support tube, and a valve operating element supported from and below said mounting structure and substantially traversing the liquid passage of said apertured encircling member and disposed axially below said valve tube and normally abutting said valve stem to open said valve and cause flow of liquid until accumulation of liquid in the receptacle has exceeded a predetermined weight.

5. A device for supporting fount receptacles and for controlling the supply of liquid to such receptacles having in combination, a vertical support tube having an open lower discharge end, means for removably securing said support tube in vertical position to the discharge end of a depending liquid supply pipe, mounting structure slidably disposed upon the intermediate portion of said support tube and including a pair of opposed horizontally spaced receptacle-engaging elements, means for adjusting the spaced relation of said elements to accommodate and support liquid receptacles varying considerably in diameters or widths, an apertured member secured to said mounting structure and disposed at a distance below the same for encircling the lower end of said supporting tube and having a depending liquid passage formed therein open at its lower end, a support abutment secured upon the lower portion of the exterior of said tube support, a coil spring interposed between said abutment and said supporting structure of a tension sufficient to more than overcome the weight of said mounting structure and the receptacle when the same is empty, a normally closed valve mounted within the lower portion of said support tube and having an axial valve stem projecting beyond the lower end of said support tube, a depending arm affixed to the medial portion of said mounting structure and disposed in close spaced relation to said tube and a combined liquid deflecting and valve-releasing element affixed to the lower end of said depending arm and having a valve-actuating and liquid deflecting surface axially opposed to the lower end of said tube and to said valve stem projecting therefrom.

6. A device for supporting fount receptacles and for controlling the supply of liquid to such receptacles, having in combination a vertical support tube and conduit adapted to be secured at its upper end to the discharge end of a depending liquid supply pipe, mounting structure having a central member slidably disposed upon the intermediate portion of said support tube and having outwardly extending attachment elements for conection with and for supporting the upper edge portion of a receptacle, said support tube having an open lower discharge end, a liquid-supply valve mounted within said lower end and having means for normally urging said valve to closed position and having an operating stem projecting axially some distance below the lower end of said support tube, a depending member fixed to the medial portion of said mounting structure and disposed in close spaced relation to the exterior of said support tube and having affixed to its lower end a stem-abutment element opposed to said projecting stem of the valve structure, stationary, spring-abutment means disposed exteriorly of said support tube and adjacent the lower portion thereof and a coil spring surrounding the intermediate portion of said supporting tube and interposed between said spring abutment element and the slidable central member of said mounting structure to urge said structure upwardly relative to said support tube, thereby causing said valve-stem-abutment element to open said valve until weight of accumulated liquid in a receptacle connected with said attachment elements is sufficient to overcome tension of said coil spring.

7. The structure set forth in claim 6 wherein a liquid discharge passage is disposed at the side of said valve-stem-abutment element and wherein said abutment element is shaped to deflect liquid discharged from said support tube to prevent splashing thereof against the bottom of a supported receptacle.

References Cited in the file of this patent

UNITED STATES PATENTS

| | | |
|---|---|---|
| 2,107,573 | Langdon et al. | Feb. 8, 1938 |
| 2,501,727 | Kubista | Mar. 28, 1950 |